US012185436B2

(12) United States Patent
Schlipf

(10) Patent No.: US 12,185,436 B2
(45) Date of Patent: Dec. 31, 2024

(54) METHOD FOR MANUFACTURING AN ELECTRICAL HEATING DEVICE

(71) Applicant: Türk & Hillinger GmbH, Tuttlingen (DE)

(72) Inventor: Andreas Schlipf, Tuttlingen (DE)

(73) Assignee: TÜRK & HILLINGER GMBH, Tuttlingen (DE)

( * ) Notice: Subject to any disclaimer, the term of this patent is extended or adjusted under 35 U.S.C. 154(b) by 1276 days.

(21) Appl. No.: 16/866,909

(22) Filed: May 5, 2020

(65) Prior Publication Data

US 2020/0359466 A1 Nov. 12, 2020

(30) Foreign Application Priority Data

May 8, 2019 (DE) .................... 10 2019 111 920.0

(51) Int. Cl.
*H05B 3/74* (2006.01)
*H05B 3/86* (2006.01)
(Continued)

(52) U.S. Cl.
CPC ............... *H05B 3/748* (2013.01); *H05B 3/86* (2013.01); *H05B 6/50* (2013.01); *H01C 17/02* (2013.01);
(Continued)

(58) Field of Classification Search
CPC . H05B 3/42; H05B 3/50; H05B 3/748; H05B 3/86; H05B 2203/017; Y10T 29/49083; H01C 17/02
See application file for complete search history.

(56) References Cited

U.S. PATENT DOCUMENTS 6,172,345 B1 * 1/2001 Dial ...................... H01C 17/02 219/544
2018/0235032 A1 8/2018 Schlipf
2019/0098704 A1 3/2019 Schlipf

FOREIGN PATENT DOCUMENTS

DE 10 2010 006 356 A1 8/2011
DE 10 2018 101 195 A1 8/2018
(Continued)

OTHER PUBLICATIONS

Machine Translation of EP 2 203 027, Oct. 2023. (Year: 2323).*
(Continued)

*Primary Examiner* — A. Dexter Tugbang
(74) *Attorney, Agent, or Firm* — Panitch Schwarze Belisario & Nadel LLP

(57) ABSTRACT

A method for manufacturing an electrical heating device includes the steps of providing a coil form with a longitudinal axis, winding an electrical heating element on the coil form along the longitudinal axis and inserting one end section of the electrical heating element and a connecting wire into the opening passing through the coil form, inserting the coil form with an electrical heating element wound on it into an opening passing through the coil form parallel to the longitudinal axis into the interior of a tubular metal jacket, filling the tubular metal jacket with an electrically insulating, heat-conductive powder and compacting the tubular metal jacket with coil form inserted therein and filled with the electrically insulating, heat-conductive powder, wherein, by means of the compaction, the coil form is deformed to change the ratio between the length of the main axis and the length of the secondary axis.

20 Claims, 7 Drawing Sheets

(51) Int. Cl.
*H05B 6/50* (2006.01)
*H01C 17/02* (2006.01)

(52) U.S. Cl.
CPC ... *H05B 2203/017* (2013.01); *Y10T 29/49083* (2015.01)

(56) References Cited

FOREIGN PATENT DOCUMENTS

| | | | | |
|---|---|---|---|---|
| DE | 10 2018 104 897 A1 | 9/2018 | | |
| EP | 2203027 A1 * | 6/2010 | ............... | H05B 3/48 |

OTHER PUBLICATIONS

Paperno et al, "A Tube-Core Orthogonal Fluxgate Operated in Fundamental Mode," in IEEE Transactions on Magnetics, vol. 44, No. 11, pp. 4018-4021, Nov. 2008. (Year: 2008).*

GPTO Deutsches Patent- und Markenamt—Office Action dated May 12, 2020 issued in parallel pending German patent application No. 10 2019 111 920.0.

* cited by examiner

METHOD FOR MANUFACTURING AN ELECTRICAL HEATING DEVICE

CROSS-REFERENCE TO RELATED APPLICATIONS

This application claims priority under 35 U.S.C. § 119(b) to German Application No. 10 2019 111 920.0, filed May 8, 2019, the disclosure of which is incorporated by reference herein in its entirety.

BACKGROUND OF THE INVENTION

Electrical heating devices have been used for many years for heating objects and/or media. In one common design of such an electrical heating device, the heating effect is achieved by the use of a heating wire or resistive wire, which is wound onto a coil form. The coil form is then inserted into a tubular metal jacket that is filled with a powder or granulate with good heat-conducting, but electrically insulating properties, particularly, magnesium oxide. The electrical contacting of the heating wire can be realized basically through sections of the heating wire extending out of the tubular metal jacket, but usually the alternative is chosen of providing connecting wires and extending these connecting wires out of the electrical heating device, so that the electrical contact to the connecting wires is realized within the tubular metal jacket.

In many applications, it is especially preferred to use press contacting, in which openings are provided in the coil form, into which one end section of the electrical heating element and the connecting wire is inserted, and these are then pressed together. In this way, a large surface area and relatively robust contact can be generated.

For current uses of electrical heating devices, two developments can be identified: on one hand, there is a continuing trend toward miniaturization. The installation space available for the heating devices continues to become smaller and smaller, which can make press contacting more and more difficult. At the same time, there are more and more low-voltage applications, for example, in the automotive industry, where only the onboard electrical system with voltages in the low two-digit voltage range is available for supplying power. However, the high current values needed for supplying the necessary power, which can be several amperes, then require connecting wires with large cross sections that must be housed in the coil form, which is at the same time subject to the trend toward smaller dimensions due to the desired miniaturization. This results in very small wall thicknesses of the coil form, at least in some sections, which makes the coil form easily breakable during the press contacting and can make the electrical heating device unusable.

The task of the invention is to disclose a method for manufacturing electrical heating devices, with which miniaturized heating devices for low-voltage applications can also be manufactured easily and with improved reliability for processing.

This task is achieved by a method for manufacturing an electrical heating device with the features of claim 1. Advantageous refinements of the method are the subject matter of the dependent claims.

The central lesson learned that forms the basis of the invention is that it is possible to shape the coil form in a targeted way through a compacting step, even if it is already housed in the tubular metal jacket of the electrical heating device. Because the cross-sectional shape of the coil form with windings is important for the temperature profile on the tubular metal jacket of the electrical heating device, particularly in the circumferential direction, it was previously always assumed that the shape of the coil form to be used and thus also the cross-sectional surface available for openings in the coil form should be defined by this desired temperature profile.

BRIEF SUMMARY OF THE INVENTION

Accordingly, the method for manufacturing an electrical heating cartridge now usually has, as the first step, providing a coil form with a longitudinal axis, wherein the coil form is shaped so that cross-sectional surfaces of the coil form, to which the longitudinal axis is perpendicular, has a main axis, which corresponds to the largest diameter of the cross-sectional surface and a secondary axis, which corresponds to the smallest diameter of the cross-sectional surface, and wherein the coil form has at least one opening that extends parallel to the longitudinal axis and preferably passes through the coil form.

The longitudinal axis is here the axis of the coil form that extends parallel to the direction of the coil pitch of the normally wound heating element.

A diameter of the cross-sectional surface is to be understood here as a line that extends, starting from a point of the outermost edge of the cross-sectional surface through the geometric center of mass of the cross-sectional surface to an opposite point of the outermost edge of the cross-sectional surface. Accordingly, in this case, which is different from the diameter of a circular disk, the lengths of all diameters are generally not equal.

In a first variant of the method according to the invention, now at least one section of an electrical heating element is wound on the coil form along the longitudinal axis—that is, in a direction of the coil pitch extending parallel to the longitudinal axis—and, for providing a press contacting, one end section of the electrical heating element and one section of a connecting wire are inserted into the same opening extending parallel to the longitudinal axis in the coil form. For the sake of completeness, it should be noted that particularly the insertion of the connecting wire into the opening does not have to be performed at this point of the method, but instead can also be performed later, particularly when the coil form with windings is already housed in the tubular metal jacket.

In a second variant of the method according to the invention, the flexibility opened up by its application with regard to the cross section of the opening extending parallel to the longitudinal axis of the coil form is exploited in a different way by the coil form. In this variant, a coiled section of the electrical heating element is inserted into at least one opening passing through the coil form parallel to the longitudinal axis. Here, a miniaturization of the electrical heating device has the result that the heating wire coil is arranged in the interior of the coil form, which is possible due to the larger opening in the coil form that can be realized with the method according to the invention.

In another step of the method, the coil form prepared in this way—thus, for variant 1, the coil form with electrical heating element coiled on it at least in some sections and preferably the end section of the electrical heating element inserted in the opening extending parallel to the longitudinal axis in the coil form and the section of the connecting wire or, for variant 2, the coil form with the coiled section of the electrical heating element inserted into the at least one opening passing through the coil form parallel to the longitudinal axis—is inserted into the interior of a tubular metal jacket.

To guarantee the required electrical insulation of the heating conductor to the tubular metal jacket, to rule out empty volumes and to guarantee a stable arrangement of the components within the tubular metal jacket in both alternatives, the tubular metal jacket is then filled with an electrically insulating, heat-conductive powder or granulate.

Finally, the tubular metal jacket with coil form inserted therein and filled with electrically insulating, heat-conductive powder or granulate is compacted, wherein the compacting deforms the coil form so that the ratio between the length of the main axis and the length of the secondary axis and/or a change of the position of the main axis and secondary axis relative to each other is produced and either a press contact is produced between connecting wires and sections of the electrical heating element inserted into the opening passing through the coil form parallel to the longitudinal axis or the inner wall surface of the opening passing through the coil form parallel to the longitudinal axis is brought into contact with the coiled section of the electrical heating element inserted into the opening passing through the coil form parallel to the longitudinal axis.

Here, the desired shape of the coil form determines the desired change to the ratio of the length of the main and secondary axes or the position of the main and secondary axes relative to each other, which cannot usually be achieved with typical, purely isotropic compacting steps that rescale the cross-sectional surface by reducing the different dimensions by an identical factor.

The feature of changing the ratio of the length of the main and secondary axes and/or changing the position of the main axis and secondary axis relative to each other thus is synonymous to a desired deformation of the coil form being performed, in which deformation to different degrees is produced in different directions of the cross-sectional surface.

In practice, the compacting has at least partial steps, in which pressing forces of different strength are exerted in different spatial directions and the pressing method to be used for a given, desired configuration of the electrical heating device is adapted or optimized by someone skilled in the art with respect to directional distribution and strength of the pressing forces and possible division into different steps, in order to achieve the desired result.

It has proven especially advantageous when a coil form is provided whose cross-sectional surface is oval or rectangular.

To be able to optimally take advantage of the flexibility of the cross-sectional surface of the coil form, it is advantageous if a coil form is prepared in which the cross-sectional surface of at least one opening passing through the coil form parallel to the longitudinal axis deviates from the shape of a circular disk, because its possible diameter is always limited by the smallest dimension of the coil form.

If a coil form is provided, in which the cross section of at least one of the openings passing through the coil form parallel to the longitudinal axis follows the outer contour of the coil form at least in some sections, this can lead to a maximization of the usable cross-sectional surface of the openings, which is then usable for connecting wires with larger cross section.

In practice it has been shown that it can be important for successful compacting that the compacting is performed in multiple steps, for example, by a first compacting step with lower pressure and a second compacting step with higher pressure. In one especially preferred construction, in different compacting steps, the forces acting from different directions are varied, for example, in that a pre-compacting step is performed with isotropic pressing forces before a change in shape of the coil form, which changes the ratio of the main axis to the secondary axis, through an anisotropic compacting, or vice versa. It has been shown that such measures can significantly reduce waste.

For providing series manufacturing of electrical heating devices with the method according to the invention, it is recommended, as already mentioned, to try to optimize the pressing process also with different sequences of pressing steps with respect to the directional distribution and strength of different pressing forces. For example, apart from possible isotropic pre-compacting or post-compacting steps, quite different effects may be produced when pressing forces are applied either simultaneously or one after the other with the same directional distribution, e.g., for a rectangular cross section, first only force A on the long sides of the rectangle and then, in a second step, only force B on the short sides, or force A and force B are applied onto the respective sides simultaneously in one pressing step.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1A:
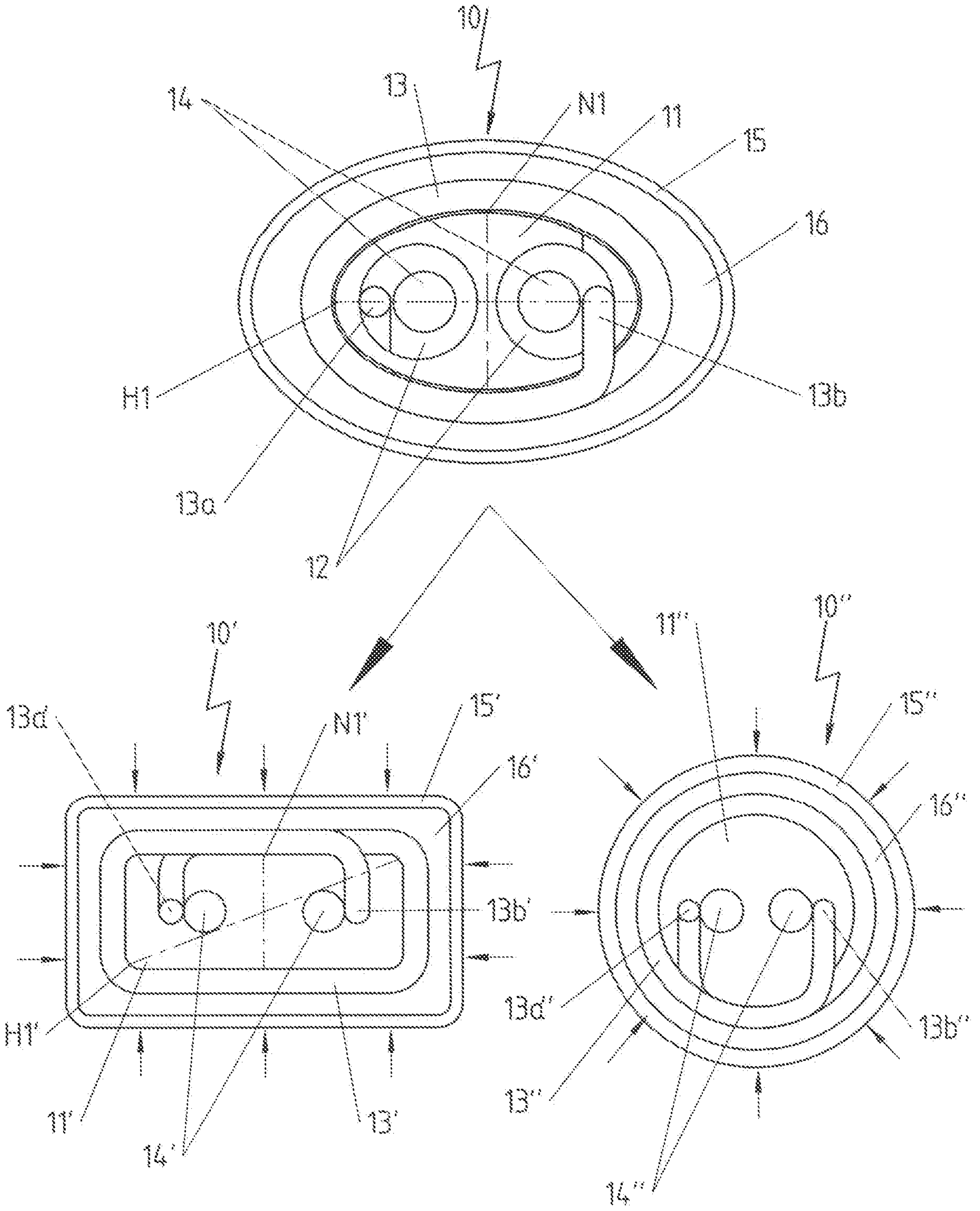
FIG. 1*a* is an illustration of side cross-sectional views of the basic principle of the first variant of the invention using a first example.

FIG. 1*a* shows the basic principle of the first variant of the invention for a first example. In the upper area of FIG. 1*a*, a cross section through an electrical heating device 10 before the compacting is shown. The tubular metal jacket 15 can be seen, in whose interior the oval coil form 11 is arranged with main axis H1, secondary axis N1, and two openings 12 parallel to its longitudinal axis extending at the center toward the viewer with disk-like opening cross sections and is embedded in electrically insulating powder or granulate 16 with good heat-conducting properties, e.g., magnesium oxide.

In the opening 12 of the coil form 11, an end section 13*a*, 13*b* of the electrical heating element 13 designed as a heating conductor coiled on the coil form 11 is arranged together with a connecting wire 14.

At the bottom left and bottom right in FIG. 1*a*, cross sections of two electrical heating devices 10', 10" are shown with coil forms 11', 11", electrical heating elements 13, 13', 13" designed as heating conductors, connecting wires 14', 14", tubular metal jackets 15', 15", and electrically insulating powder or granulate 16', 16" with good heat-conducting properties, which can be obtained from the arrangement shown in the upper part of FIG. 1*a* through suitable compacting processes as shown schematically by the arrows, which, however, do not indicate actual instructions for pressing direction and/or pressing force distribution during the pressing process.

The coil form 11', 11" and the tubular metal jacket 15', 15" have been reshaped in the example at the bottom left to a rectangular shape by compacting or pressing processes, in the example at the bottom right to a circular shape, which automatically has the result that the ratio of the main axis H1', H1" to the secondary axis N1, N1" also changes. In the example of the coil form 11' shaped into a rectangle, it is also easy to see that some cases also result in a change to the position of the main axis H1, H1' relative to the secondary axis N1, N1', because there the angle between the axes determined according to the definition specified above has obviously changed.

The openings 12 of the original coil form 11 are closed by the compacting, so that an intimate press contact is produced between the end sections 13*a'*, 13*b'* and 13*a'* 13*b* on one side and the corresponding connecting wires 14', 14", respectively.

It is to be emphasized particularly that the dimensions of the coil forms 11', 11" after the compacting are such that the openings 12 in the coil form 11 could not be accommodated in them. As a consequence from the production following the method according to the invention, initially significantly larger openings can be provided in the coil form for inserting connecting wires or heating wire coils.

Figure 3A:
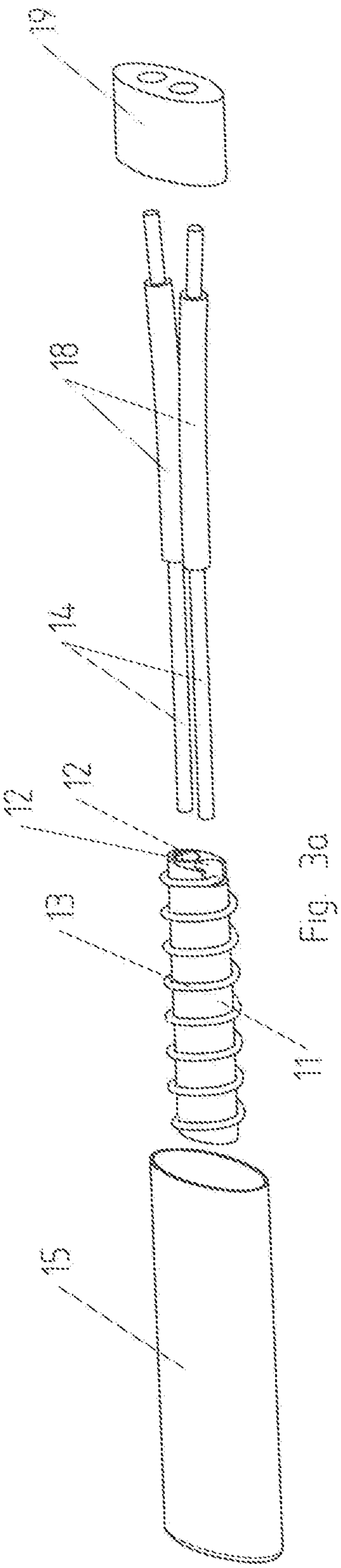
FIG. 3*a* is a partially exploded view including components for manufacturing an electrical heating device according to the first example from FIG. 1*a*.
Figure 3B:
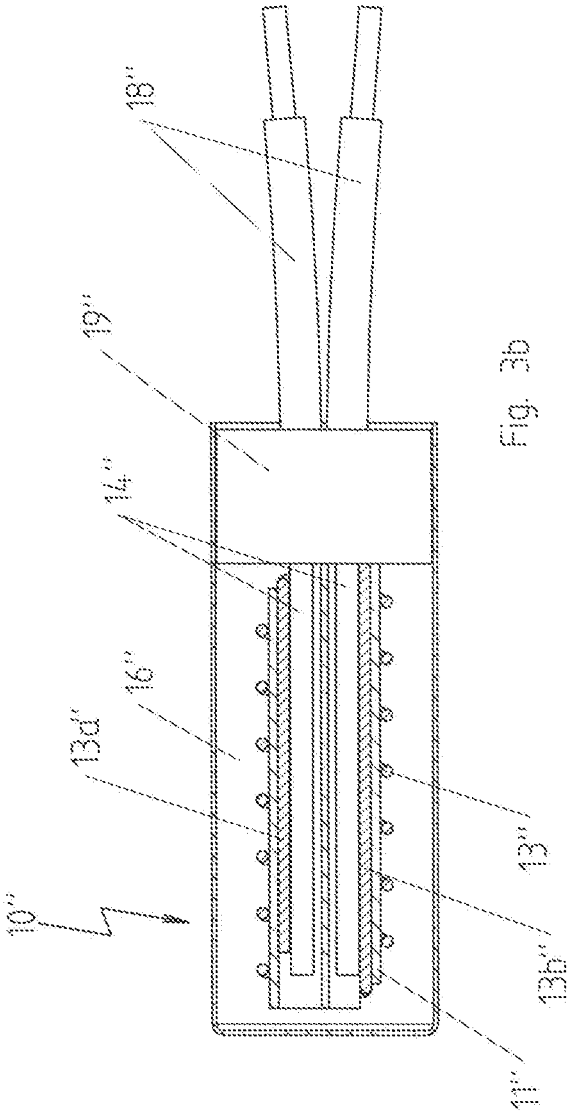
FIG. 3*b* is an electrical heating device produced from the components shown in FIG. 3*a* in cross section.

FIGS. 3*a* and 3*b* show the components of one such electrical heating device and, respectively, the electrical heating device manufactured with the method according to the invention in the variant shown in FIG. 1*a* on the right in cross section. Accordingly, the reference symbols of FIG. 3*a* correspond to the reference symbols of the illustration in FIG. 1*a* at the top and the reference symbols of FIG. 3*b* correspond to the reference symbols of the illustration in FIG. 1*a* at the bottom right and designate the same components.

As can be seen in FIG. 3*a*, a coil form 11 with openings 12 is provided, in which, in this example, the electrical heating element 13 is already coiled and inserted with its end sections 13*a*, 13*b* not visible in FIG. 3*a* in the openings 12. The cross section of the coil form 11 and the opening 12 can be seen in the illustration of FIG. 1*a* at the top. The coiling of the electrical heating element 13 can also be performed at a later time, but it must take place before the coil form 11 is inserted into the tubular metal jacket 15 with the base and would also be better to be performed before the connecting wires 14, which carry insulation 18 in the part later extending out from the electrical heating device, are inserted into the openings 12, because this makes the threading of the end sections 13*a*,13*b* of the electrical heating element easier.

When the coil form 11 with windings is then inserted into the tubular metal jacket 15 and the connecting wires 14 are inserted at least in some sections into the openings 12, which can take place while the coil form 11 is still arranged outside of the tubular metal jacket 15 or when the coil form 11 is already arranged inside the tubular metal jacket 15, the tubular metal jacket 15 is filled with electrically insulating, heat-conductive powder or granulate, e.g., magnesium oxide, and closed with an optional plug 19.

This configuration is then transformed into the electrical heating device 10" by compacting the tubular metal jacket 15 with coil form 11 inserted therein and filled electrically insulating, heat-conductive powder or granulate, wherein, by the compacting, the coil form 11 is deformed so that a change of the ratio between the length of the main axis and the length of the secondary axis and/or a change of the position of the main axis and secondary axis relative to each other is produced and a press contact between connecting wires 14 and sections 13*a*, 13*b* of the electrical heating element 13 inserted into the openings 12 passing through the coil form 11 parallel to the longitudinal axis is produced.

Figure 1B:
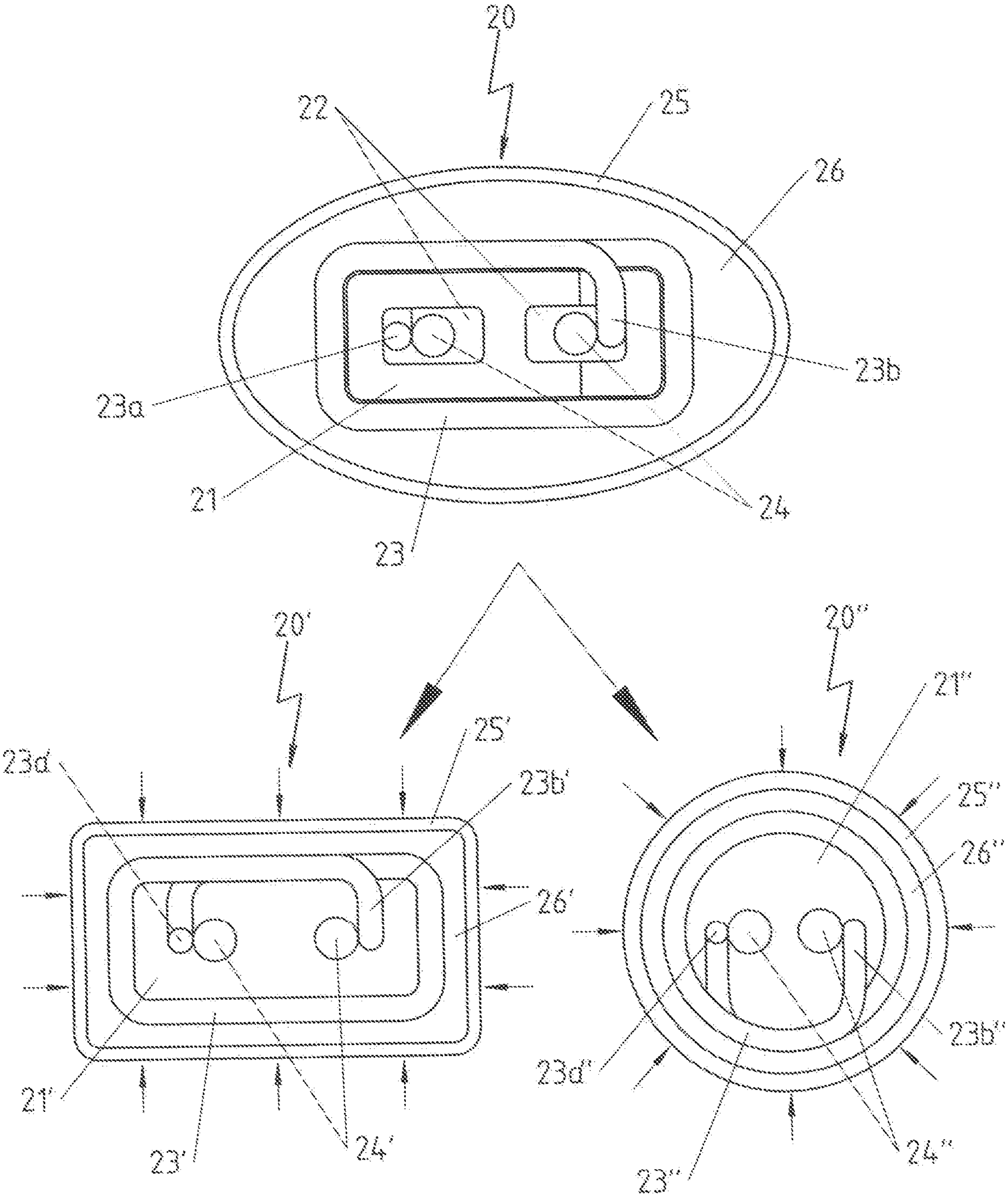
FIG. 1*b* is a second illustration of side cross-sectional views of the basic principle of the first variant of the invention using a second example.

FIG. 1*b* shows the basic principle of the first variant of the invention for a second example of an electrical heating device 20 before the pressing or the electrical heating devices 20', 20" obtained by pressing this intermediate stage with coil forms 21, 21', 21", openings 22, electrical heating element 23, 23', 23", connecting wires 24, 24', 24", tubular metal jackets 25, 25', 25", and electrically insulating, heat-conductive powder or granulate 26, 26', 26". The difference between the two examples according to FIG. 1*a* and FIG. 1*b* consists only in the geometric base shape on one hand for the provided coil form 21 and on the other hand for the opening cross section of the openings 22 provided therein. For this reason, reference to the description for FIG. 1*a* can also be used for the description of FIG. 1*b*, wherein the reference symbols used in the earlier figure have now been increased by ten.

Figure 4A:
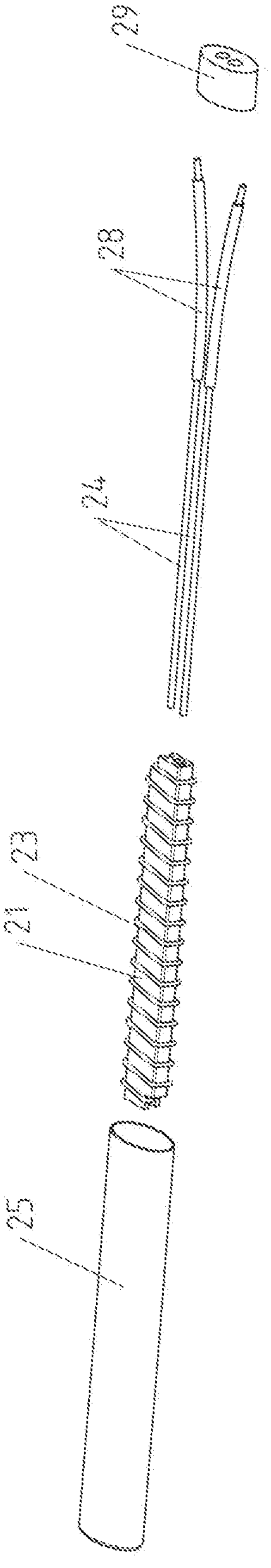
FIG. 4*a* is a partially exploded view including components for manufacturing an electrical heating device according to the first example from FIG. 1*b*.
Figure 4B:
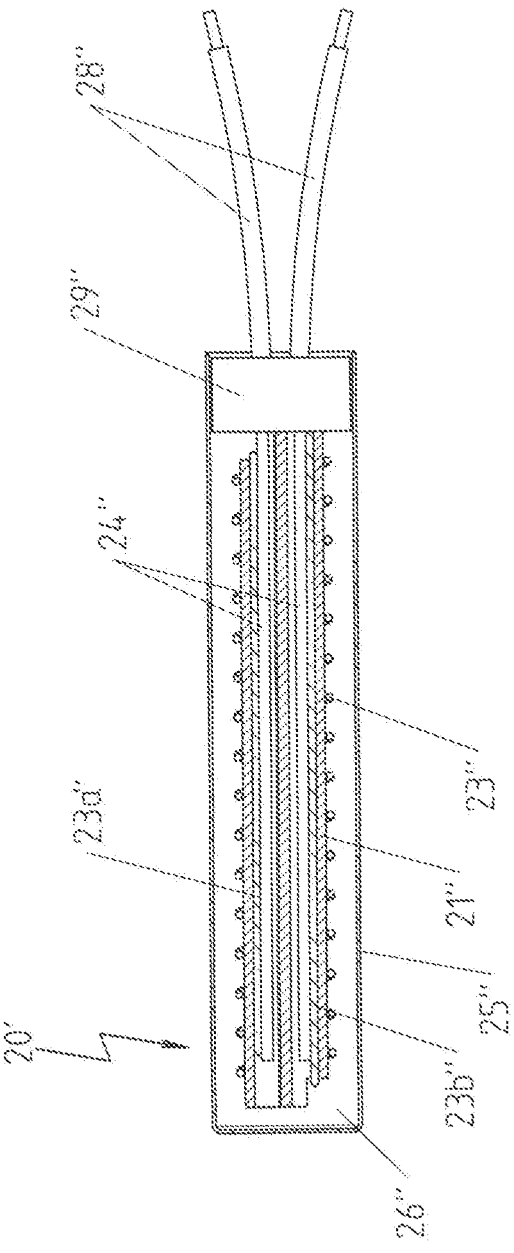
FIG. 4*b* is an electrical heating device produced from the components shown in FIG. 4*a* in cross section.

FIGS. 4*a* and 4*b* show the components of one such electrical heating device and the electrical heating device manufactured with the method according to the invention, respectively, in the variant shown in FIG. 1*b* on the right in cross section. Accordingly, the reference symbols of FIG. 4*a* correspond to the reference symbols of the illustration in FIG. 1*b* at the top and the reference symbols of FIG. 4*b* correspond to the reference symbols of the illustration in FIG. 1*b* at the bottom right and designate the same components.

As can be seen in FIG. 4*a*, a coil form 21 with openings 22 is provided, in which, in this example, the electrical heating element 23 is already coiled and with its end sections 23*a*, 23*b* not visible in FIG. 4*a* inserted in the openings 22. The cross section of the coil form 21 and the openings 22 can be seen in the illustration in FIG. 1*a* at the top. The coiling of the electrical heating element 23 can also be performed at a later time, but it must take place before the coil form 21 is inserted into the tubular metal jacket 25 with base and would also be better to be performed before the connecting wires 24, which later have insulation 28 in the part extending out of the electrical heating device, are inserted in the openings 22, because this makes the threading of the end sections 23*a*, 23*b* of the electrical heating element easier.

When the coil form 21 with windings is then inserted into the tubular metal jacket 25 and the connecting wires 24 are inserted at least in some sections into the openings 22, which can happen while the coil form 21 is still arranged outside the tubular metal jacket 25 or when the coil form 1 is already arranged inside the tubular metal jacket 25, the tubular metal jacket 25 is filled with electrically insulating, heat-conductive powder or granulate, e.g., magnesium oxide, and closed with an optional plug 29.

This configuration is then transformed into the electrical heating device 20" by compacting the tubular metal jacket 25 with coil form 21 inserted therein and filled, electrically insulating, heat-conductive powder or granulate, wherein the coil form 21 is deformed by the compacting so that a change of the ratio between the length of the main axis and the length of the secondary axis and/or a change of the position of the main axis and secondary axis relative to each other is produced and a press contact between connecting wires 24 and sections 23*a*, 23*b* of the electrical heating element 23 inserted into the opening 22 passing through the coil form 21 parallel to the longitudinal axis is also produced.

Figure 1C:
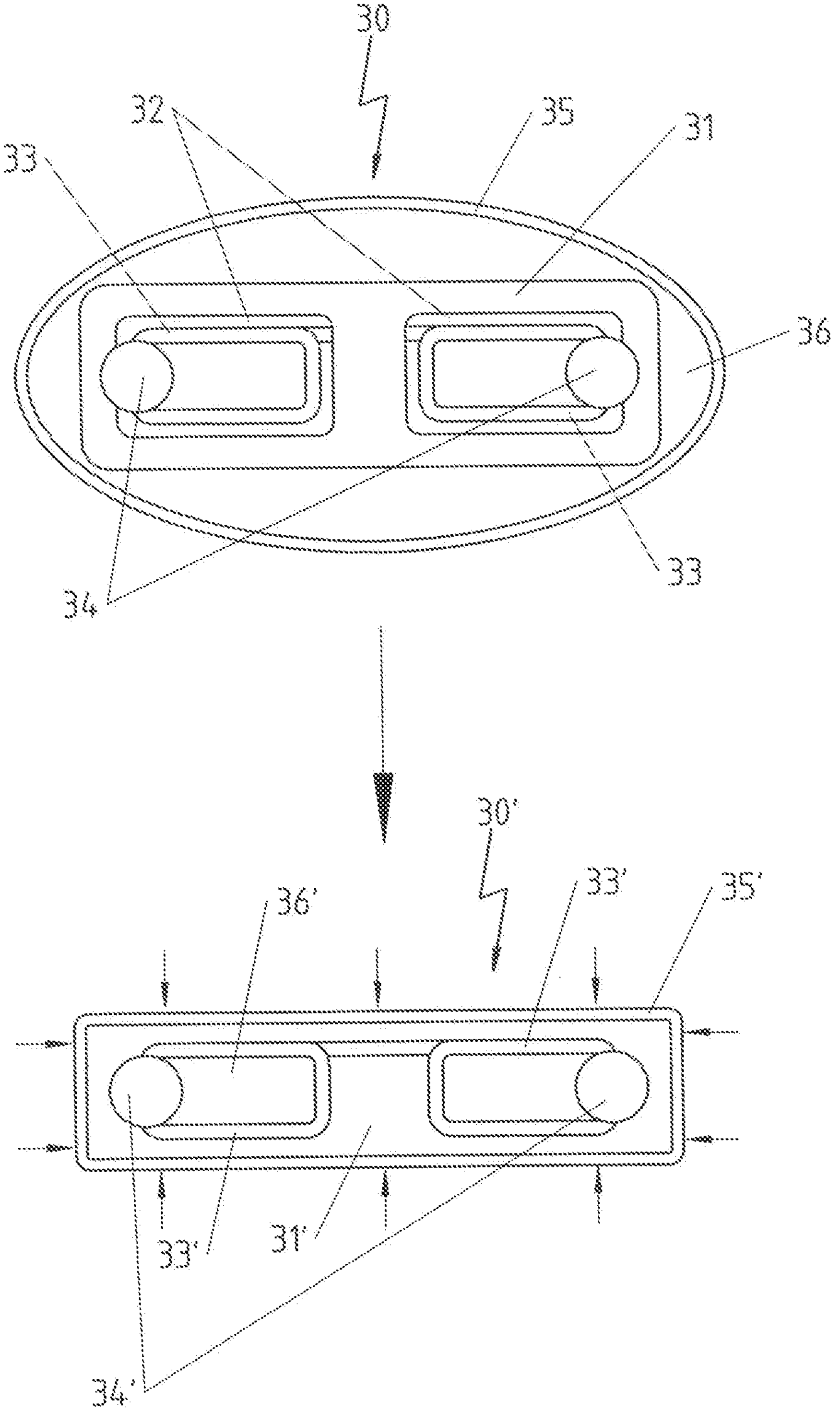
FIG. 1*c* is an illustration of side cross-sectional views of the basic principle of the second variant of the invention using a third example.
Figure 2B:
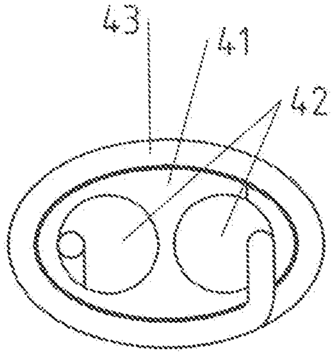
FIG. 2*b* is a cross section through the coil form with windings from FIG. 2*a*.
Figure 2A:
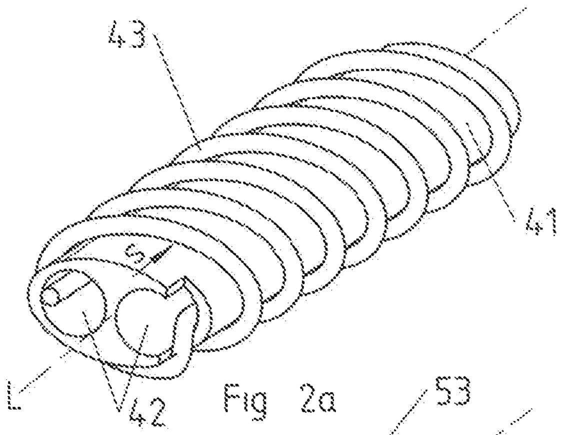
FIG. 2*a* is a top perspective view of a first example for a coil form with windings.
Figure 2D:
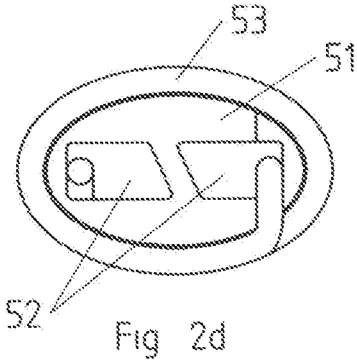
FIG. 2*d* is a cross section through the coil form with windings from FIG. 2*c*.
Figure 2C:
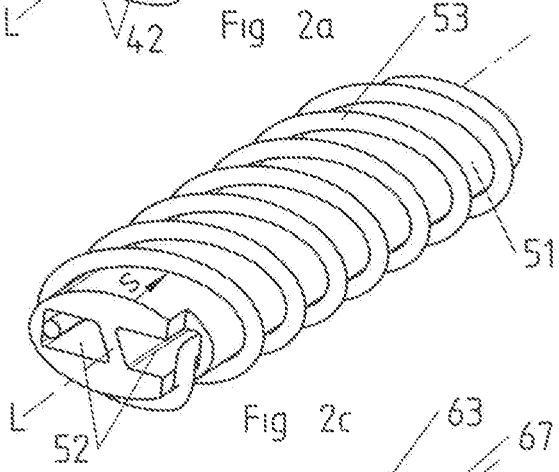
FIG. 2*c* is a top perspective view of a second example for a coil form with windings.
Figure 2F:
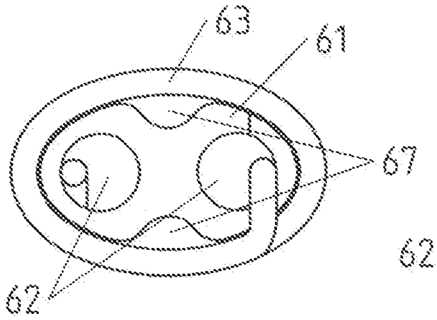
FIG. 2*f* is a cross section through the coil form with windings from FIG. 2*e*.
Figure 2E:
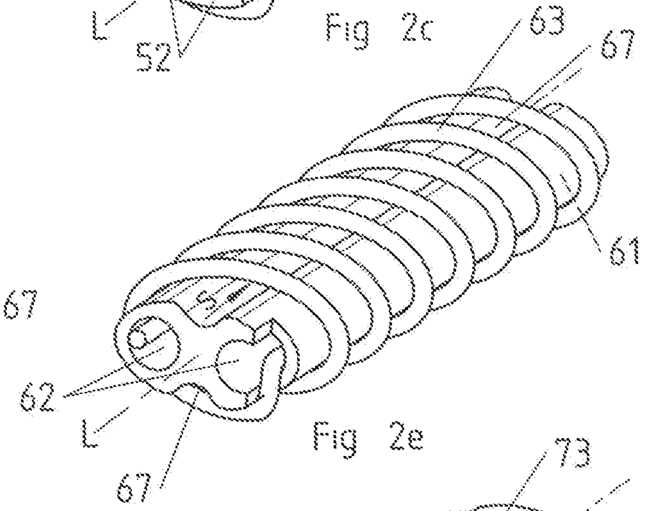
FIG. 2*e* is a top perspective view of a third example for a coil form with windings.
Figure 2H:
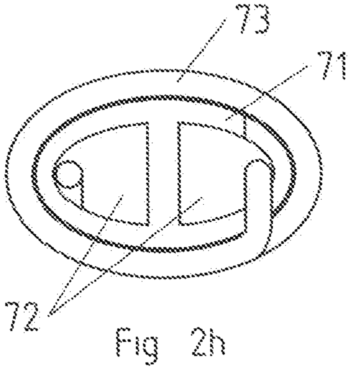
FIG. 2*h* is a cross section through the coil form with windings from FIG. 2*g*.
Figure 2G:
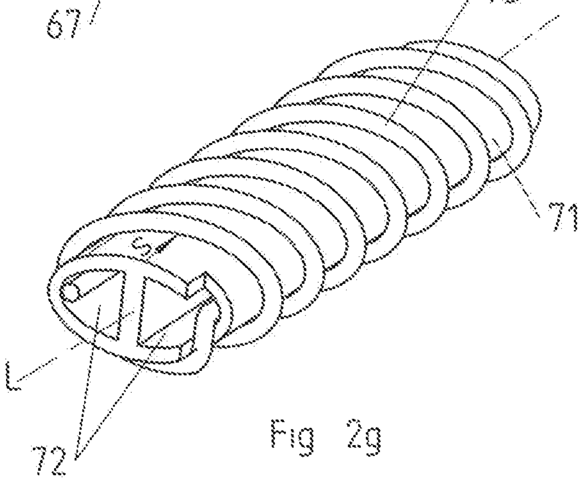
FIG. 2*g* is a top perspective view of a fourth example for a coil form with windings.

FIG. 1*c* illustrates the basic principle of the second variant of the invention using a third example. The non-pressed electrical heating device 30 can be seen at the top and the electrical heating device 30' produced by suitable pressing processes also shown here symbolically by arrows can be seen at the bottom, each with coil forms 31,31', openings 32, electrical heating elements 33, 33', connecting wires 34, 34', tubular metal jackets 35, 35', and electrically insulating, heat-conductive powder or granulate 36, 36'.

The difference between the first variant of the invention according to the first two examples shown in FIGS. 1*a* and 1*b* and the second variant of the invention according to the example shown in FIG. 1*c* is that, for the electrical heating device 30, 30', the electrical heating element 33, 33" is arranged coiled in the opening 32, which reduces the necessary installation space for the electrical heating device 30, 30', while the contact with the connecting wires can basically also take place outside of the coil form 31, 31', as will be described in more detail below using an example.

Figure 5A:
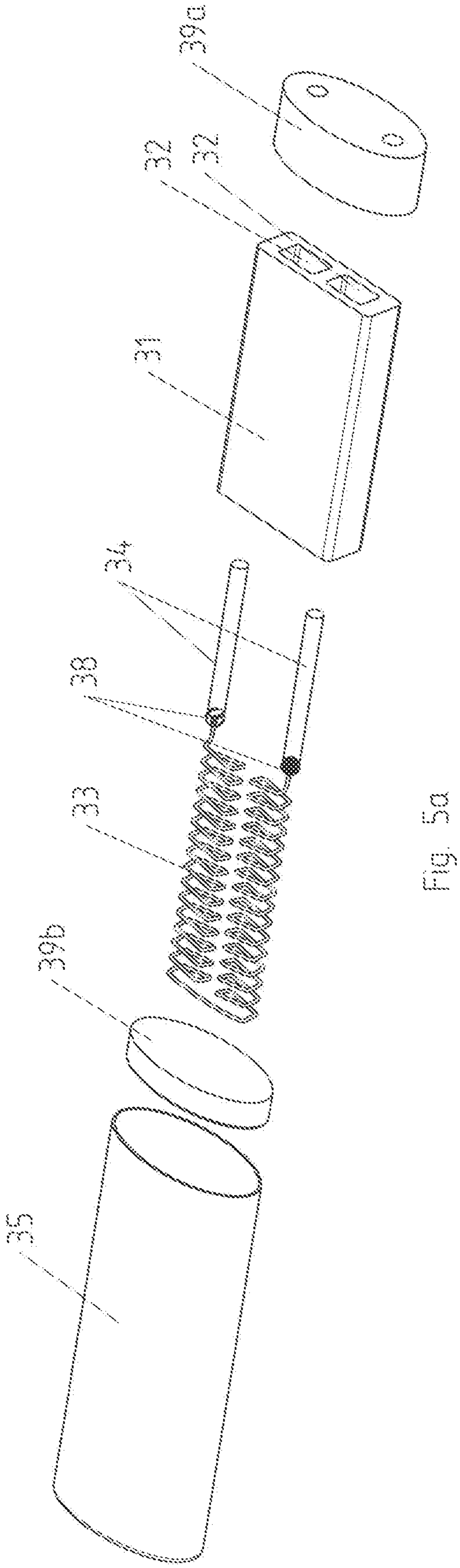
FIG. 5*a* is a partially exploded view including components for manufacturing an electrical heating device according to the third example from FIG. 1*c*.
Figure 5B:
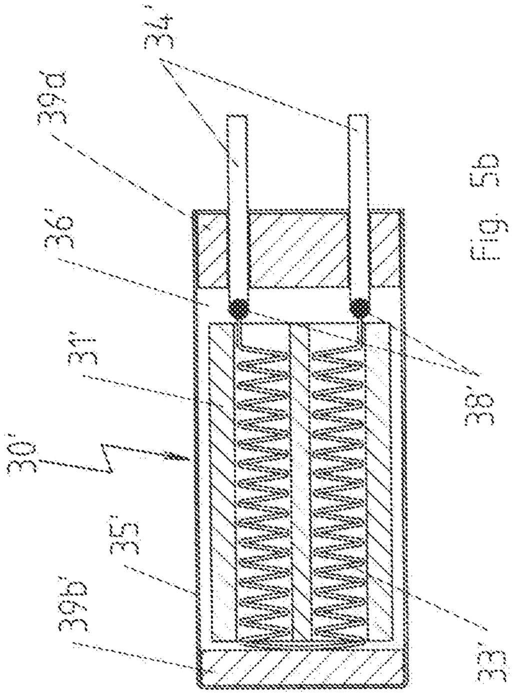
FIG. 5*b* is an electrical heating device produced from the components shown in FIG. 5*a* in cross section.

FIGS. 5*a* and 5*b* show the components of a one such electrical heating device and the electrical heating device produced with the method according to the invention in the variant shown in FIG. 1*c* at the bottom in cross section. Accordingly, the reference symbols of FIG. 5*a* correspond to the reference symbols of the top illustration in FIG. 1*c* and the reference symbols of FIG. 5*b* correspond to the reference symbols of the illustration in FIG. 1*c* at the bottom and designate the same components.

As can be seen in FIG. 5*a*, a coil form 31 with openings 32 is provided. In this example, however, the electrical heating element 33 is already coiled and connected by means of solder points 38 to the connecting wires 34 and then inserted into the openings 32 passing through the coil form 31 so that the connecting wires 34 extend out of the coil form. More details about this arrangement, which is then inserted into the tubular metal jacket 35, can be seen in the illustration in FIG. 1*c* at the top.

Therefore, because the tubular metal jacket 35 used here does not have its own base, but instead a separate base plate 39*b*, it is also possible, in particular, to keep the coiled heating element 33 under tensile stress until it is inserted into the coil form 31 or to insert the coiled heating element 33 in the opening 32 of the coil form 31 only when this is already arranged inside the tubular metal jacket 35.

After arranging the separate base plate 39*b* in the tubular metal jacket 35, the electrically insulating, heat-conductive powder or granulate 36 can be filled and then the other end of the tubular metal jacket 35 can be closed with the optional plug 39.

This configuration is then transformed into the electrical heating device 30' by compacting the tubular metal jacket 35 with coil form 31 inserted therein and filled, electrically insulating, heat-conductive powder or granulate 36, wherein by the compacting, the coil form 31 is deformed so that a change of the ratio between the length of the main axis and the length of the secondary axis and/or a change in the position of the main axis and secondary axis relative to each other is produced and the inner wall surface of the opening 32 passing through the coil form 31 parallel to the longitudinal axis is brought into contact with the coiled section of the electrical heating element 33 inserted into the opening 32 passing through the coil form 31 parallel to the longitudinal axis.

FIGS. 2*a* to 2*h* show four examples of coil forms 41, 51, 61, 71 with longitudinal axis L and an essentially equivalent oval base shape of the cross section, to which the longitudinal axis L is perpendicular, on which an electrical heating element 43, 53, 63, 73 is coiled in the direction of the coil pitch s. The differences between the coil forms 41, 51, 61, 71 are in the shape of their openings 42, 52, 62, 72 and in the presence of locally thinner sections by means of grooves 67 in the case of coil form 61.

These examples are intended to demonstrate, in particular, another degree of freedom in the design and production of an electrical heating device according to the basic principles of the invention, because, through the dimensioning of the openings 42, 52, 62, 72 and locally thinner sections of the coil form, e.g., by grooves 67 formed at suitable positions, its behavior during the compacting processes can be influenced in a desired way. Apart from the sequence of the pressing processes, this parameter can also be used to optimize the properties of the electrical heating device produced according to the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE SYMBOLS

10,10',10",20,20',20",
30,30' Electrical heating device

11,11',11",21,21',21",
31,31',41,51,61,71 Coil form
12,12',12",22,22',22",
32,32',42,52,62,72 Opening
13,13',13",23,23',23",
33,33',43,53,63,73 Electrical heating element
**13*a*,13*a*',13*a*",23*a*,23*a*',23*a*"** End section
**13*b*,13*b*',13*b*",23*b*,23*b*',23*b*"** End section
14,14',14",24,24',24",
34,34' Connecting wire
15,15',15",25,25',25",
35,35' Tubular metal jacket
16,16',16",26,26',26",
36,36' Powder or granulate
18,18",28,28" Insulation
19,19",29,29",**39*a*,39*a*'** Plug
38 Solder point
**39*b*,39*b*'** Base
67 Groove
L Longitudinal axis
s Coil pitch
H1,H1' Main axis
N1,N1' Secondary axis

The invention claimed is:

1. A method for manufacturing an electrical heating device comprising the following steps:
- providing a coil form with a longitudinal axis, wherein the coil form is shaped so that cross-sectional surfaces of the coil form, to which the longitudinal axis is perpendicular, have a main axis, which corresponds to a greatest diameter of the cross-sectional surfaces, and a secondary axis, which corresponds to a smallest diameter of the cross-sectional surfaces, and wherein the coil form has an opening extending parallel to the longitudinal axis;
  - winding at least one section of an electrical heating element on the coil form along the longitudinal axis and inserting an end section of the electrical heating element and a connecting wire into the opening passing through the coil form parallel to the longitudinal axis;
  - inserting the coil form, with the electrical heating element wound on the coil form in some sections, into an interior of a tubular metal jacket;
  - filling the tubular metal jacket with an electrically insulating, heat-conductive powder or granulate;
  - compacting the tubular metal jacket with the coil form inserted therein and filled with the electrically insulating, heat-conductive powder or granulate, wherein, by the compacting of the tubular metal jacket, which takes place in multiple steps, the coil form is deformed so that a change of a ratio between one of a length of the main axis and a length of the secondary axis or a change of a position of the main axis and the secondary axis relative to each other is produced; and
- a press contact is produced between the connecting wire and sections of the electrical heating element inserted into the opening passing through the coil form parallel to the longitudinal axis.

2. The method according to claim 1, characterized in that the coil form has a cross-sectional surface that is oval or rectangular.

3. The method according to claim 1, characterized in that the coil form has a cross-sectional surface of the opening extending parallel to the longitudinal axis in the coil form, the cross-sectional surface of the opening deviates from a shape of a circular disk.

4. The method according to claim 1, characterized in that a cross-sectional surface of the opening extends parallel to the longitudinal axis in the coil form and follows an outer contour of the coil form at least in certain sections.

5. The method according to claim 1, characterized in that forces acting from different directions are varied in different ones of the multiple steps of the compacting.

6. A method for manufacturing an electrical heating device comprising the following steps:
- providing a coil form with a longitudinal axis, wherein the coil form is shaped so that cross-sectional surfaces of the coil form, to which the longitudinal axis is perpendicular, have a main axis, which corresponds to a greatest diameter of the cross-sectional surfaces, and a secondary axis, which corresponds to a smallest diameter of the cross-sectional surfaces, and wherein the coil form has an opening extending parallel to the longitudinal axis;
- inserting a coiled section of an electrical heating element into the opening passing through the coil form parallel to the longitudinal axis;
  - inserting the coil form, with the coiled section of the electrical heating element inserted into the opening passing through the coil form parallel to the longitudinal axis, into an interior of a tubular metal jacket;
  - filling the tubular metal jacket with an electrically insulating, heat-conductive powder or granulate;
  - compacting the tubular metal jacket with the coil form inserted therein and filled with the electrically insulating, heat-conductive powder or granulate, wherein, by the compacting of the tubular metal jacket, which takes place in multiple steps, the coil form is deformed so that a change of a ratio between one of a length of the main axis and a length of the secondary axis or a change of a position of the main axis and the secondary axis relative to each other is produced; and
  - a press contact is produced between the connecting wire and sections of the electrical heating element inserted into the opening passing through the coil form parallel to the longitudinal axis.

7. The method according to claim 6, characterized in that the coil form has a cross-sectional surface that is oval or rectangular.

8. The method according to claim 6, characterized in that the coil form has a cross-sectional surface of the opening extending parallel to the longitudinal axis in the coil form, the cross-sectional surface of the opening deviates from a shape of a circular disk.

9. The method according to claim 6, characterized in that a cross-sectional surface of the opening extends parallel to the longitudinal axis in the coil form and follows an outer contour of the coil form at least in certain sections.

10. The method according to claim 6, characterized in that forces acting from different directions are varied in different ones of the multiple steps of the compacting.

11. A method for manufacturing an electrical heating device comprising the following steps:
- providing a coil form with a longitudinal axis, wherein the coil form is shaped so that cross-sectional surfaces of the coil form, to which the longitudinal axis is perpendicular, have a main axis, which corresponds to a greatest diameter of the cross-sectional surfaces, and a secondary axis, which corresponds to a smallest diameter of the cross-sectional surfaces, and wherein the coil form has an opening extending parallel to the longitudinal axis;

winding at least one section of an electrical heating element on the coil form along the longitudinal axis and inserting an end section of the electrical heating element and a connecting wire into the opening passing through the coil form parallel to the longitudinal axis;

inserting the coil form, with the electrical heating element wound on the coil form in some sections, into an interior of a tubular metal jacket;

filling the tubular metal jacket with an electrically insulating, heat-conductive powder or granulate;

compacting the tubular metal jacket with the coil form inserted therein and filled with the electrically insulating, heat-conductive powder or granulate, wherein, by the compacting of the tubular metal jacket, which takes place in multiple steps, the coil form is deformed so that a change of a ratio between one of a length of the main axis and a length of the secondary axis or a change of a position of the main axis and the secondary axis relative to each other is produced; and an inner wall surface of the opening passing through the coil form parallel to the longitudinal axis is brought into contact with the coiled section of the electrical heating element inserted into the opening passing through the coil form parallel to the longitudinal axis.

12. The method according to claim 11, characterized in that the coil form has a cross-sectional surface that is oval or rectangular.

13. The method according to claim 11, characterized in that the coil form has a cross-sectional surface of the opening extending parallel to the longitudinal axis in the coil form, the cross-sectional surface of the opening deviates from a shape of a circular disk.

14. The method according to claim 11, characterized in that a cross-sectional surface of the opening extends parallel to the longitudinal axis in the coil form and follows an outer contour of the coil form at least in certain sections.

15. The method according to claim 11, characterized in that forces acting from different directions are varied in different ones of the multiple steps of the compacting.

16. A method for manufacturing an electrical heating device comprising the following steps:

providing a coil form with a longitudinal axis, wherein the coil form is shaped so that cross-sectional surfaces of the coil form, to which the longitudinal axis is perpendicular, have a main axis, which corresponds to a greatest diameter of the cross-sectional surfaces, and a secondary axis, which corresponds to a smallest diameter of the cross-sectional surfaces, and wherein the coil form has an opening extending parallel to the longitudinal axis;

inserting a coiled section of an electrical heating element into the opening passing through the coil form parallel to the longitudinal axis;

inserting the coil form, with the coiled section of the electrical heating element inserted into the opening passing through the coil form parallel to the longitudinal axis, into an interior of a tubular metal jacket;

filling the tubular metal jacket with an electrically insulating, heat-conductive powder or granulate;

compacting the tubular metal jacket with the coil form inserted therein and filled with the electrically insulating, heat-conductive powder or granulate, wherein, by the compacting of the tubular metal jacket, which takes place in multiple steps, the coil form is deformed so that a change of a ratio between one of a length of the main axis and a length of the secondary axis or a change of a position of the main axis and the secondary axis relative to each other is produced; and an inner wall surface of the opening passing through the coil form parallel to the longitudinal axis is brought into contact with the coiled section of the electrical heating element inserted into the opening passing through the coil form parallel to the longitudinal axis.

17. The method according to claim 16, characterized in that the coil form has a cross-sectional surface that is oval or rectangular.

18. The method according to claim 16, characterized in that the coil form has a cross-sectional surface of the opening extending parallel to the longitudinal axis in the coil form, the cross-sectional surface of the opening deviates from a shape of a circular disk.

19. The method according to claim 16, characterized in that a cross-sectional surface of the opening extends parallel to the longitudinal axis in the coil form and follows an outer contour of the coil form at least in certain sections.

20. The method according to claim 16, characterized in that forces acting from different directions are varied in different ones of the multiple steps of the compacting.

* * * * *